Dec. 7, 1943.  A. L. PEARSON  2,336,122
TREE MOVING APPARATUS
Filed Feb. 6, 1942  3 Sheets-Sheet 2
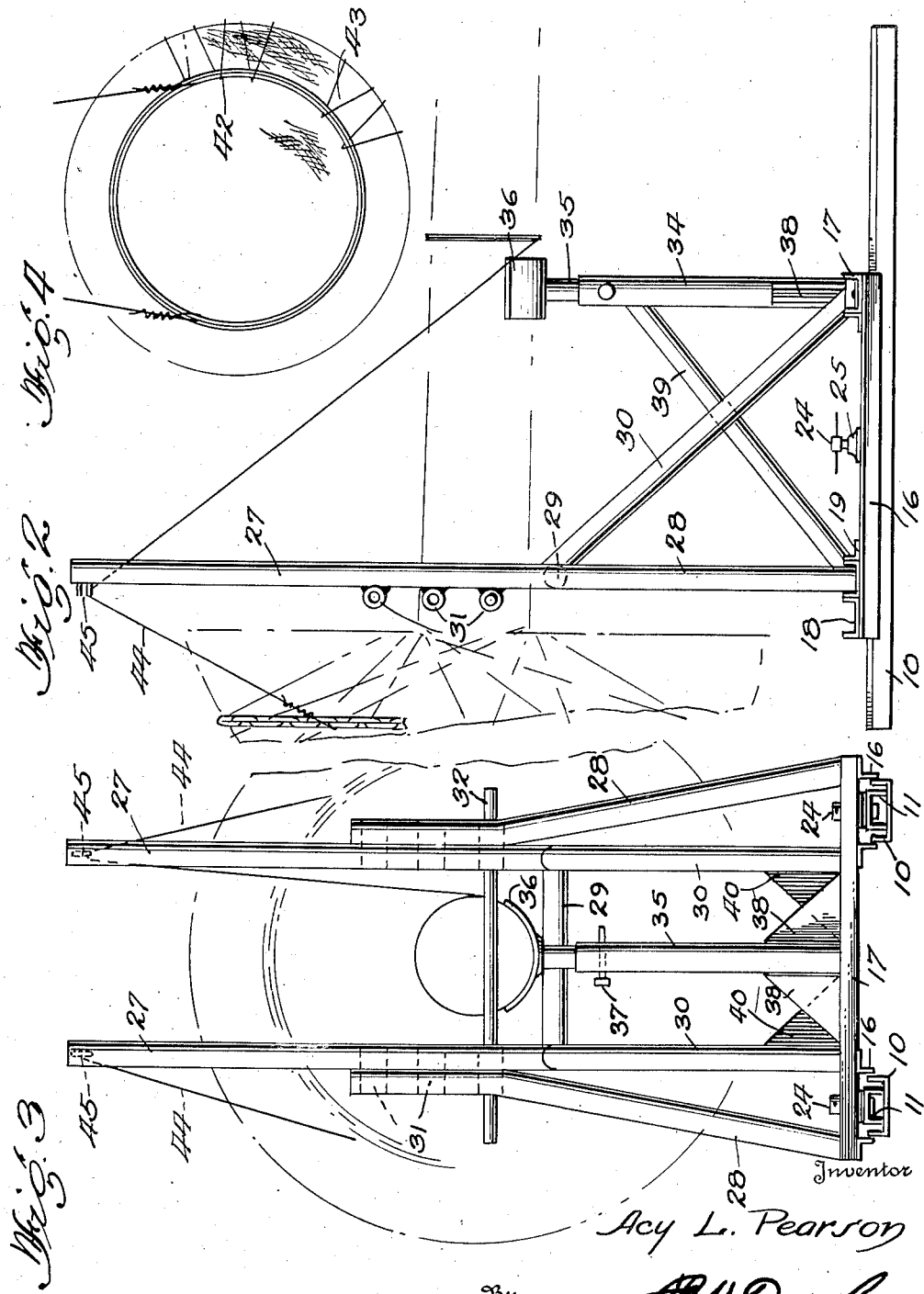
Inventor
Acy L. Pearson
By
R. W. Dahn,
Attorney

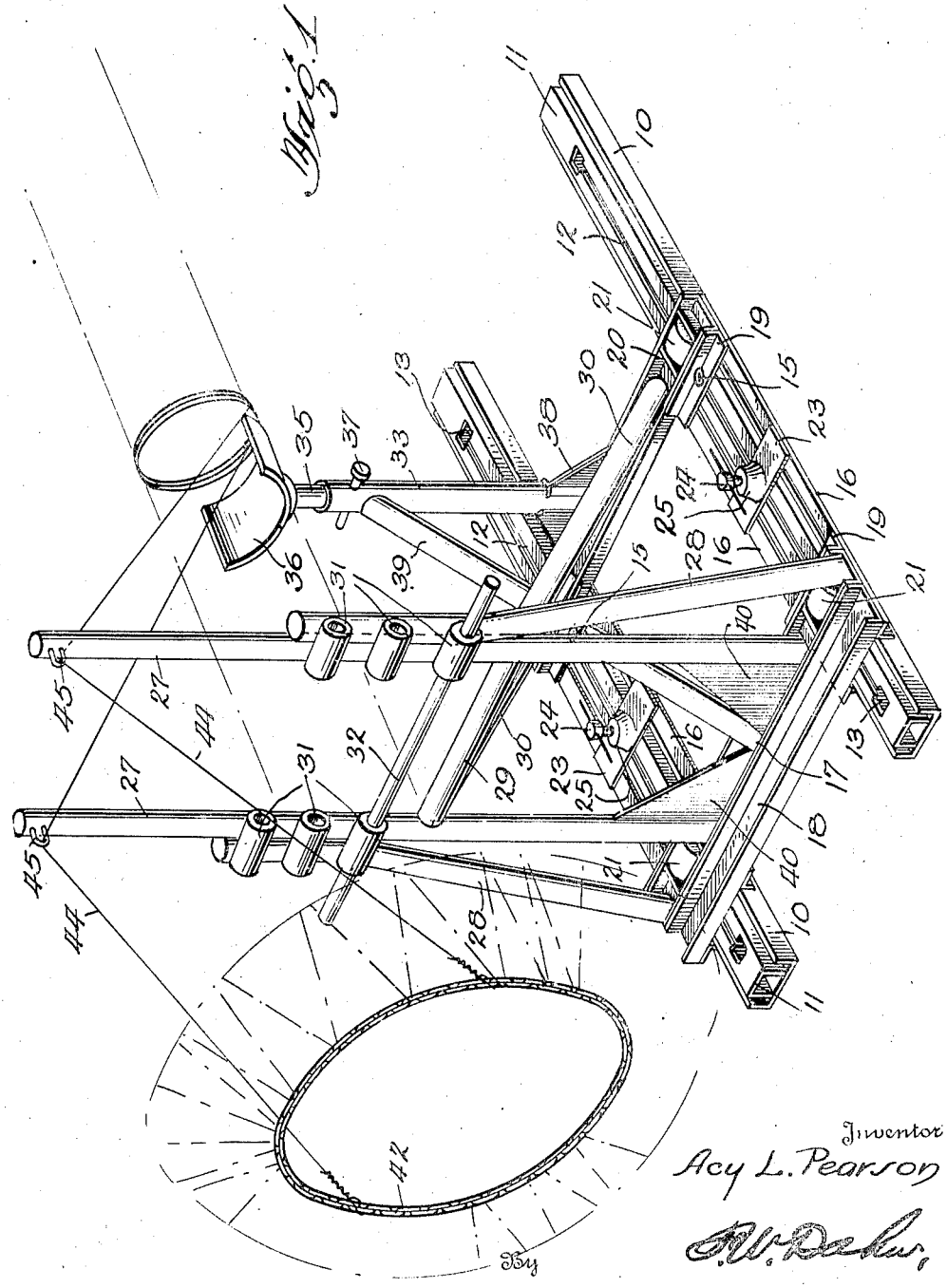

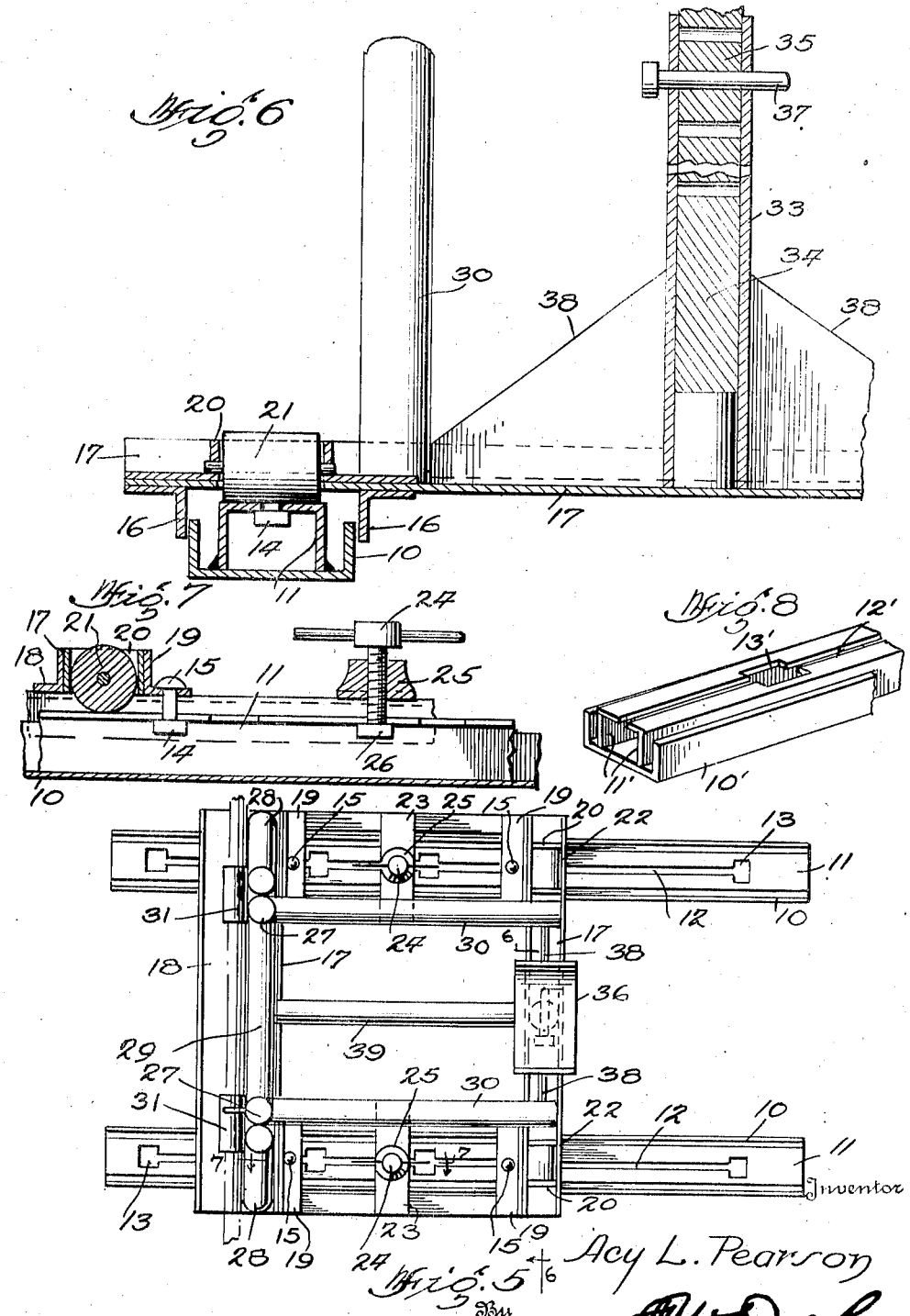

Patented Dec. 7, 1943

2,336,122

UNITED STATES PATENT OFFICE 2,336,122

TREE MOVING APPARATUS

Acy L. Pearson, Memphis, Tenn.

Application February 6, 1942, Serial No. 429,837

14 Claims. (Cl. 214—3)

My invention relates to a tree moving device, and it is an object of the same to provide a skiddable device which can be used to move a tree from place to place, as in a transplanting operation, without necessarily employing a truck or trailer or other wheeled support, said skiddable device being provided with means for supporting an uprooted tree.

Another object of the device is to provide a skid with tree supporting means that can be moved bodily lengthwise of the skid so as to balance the weight and prevent endwise tipping or tilting of the skid with its load.

Another object is to provide simple and effective means for locking the support in adjusted position on its track members.

Another object of the invention is to provide improved means to hold the ball of a tree in place while the tree is being moved.

Another object is to provide means whereby the tree support can readily be separated from or affixed to the track members or skids by which it is carried.

Still another object is to provide a simple frame that can be separated from its tracks, either for application to a tree or for transporting the tree, and so can be made to take up but little space.

Referring to the drawings, which are made a part of this application, and in which similar reference characters indicate similar parts:

Fig. 1 is a perspective of my improved device,

Fig. 2, a side elevation,

Fig. 3, an end elevation, looking from the right in Fig. 2,

Fig. 4, an elevation showing the bottom of a tree ball and means coacting therewith, Fig. 5, a plan of the device, Fig. 6, a transverse section with parts omitted, Fig. 7, a fragmentary longitudinal section through one of the tracks and coacting parts at the front end of the frame, and Fig. 8, a perspective showing parts of a modified track member or skid.

In the drawings, reference character 10 indicates bottom track members which may consist of U-shaped channel irons to which are affixed narrow U-shaped channel irons 11 in inverted relation, irons 11 being substantially narrower than parts 10. The U-beams 11 are slotted for the greater part of their length, as shown at 12, and the slots are widened at appropriately spaced points to provide apertures 13 through which square nuts 14 or other suitable enlarged heads on bolts 15 may be passed to secure the upper frame slidably on the tracks or skids. It will be understood that the parts 10, 11 at each side of the device which form detachable runners constitute tracks along which the upper frame may be adjusted, and that they serve also as skids or runners by means of which the entire device can be moved from place to place, preferably by laying rollers beneath them, though the track members can also be slid along the ground, in which case they might be bent upward at one end after the manner of sled runners.

The tree support which is slidably mounted on the tracks includes four L-shaped, longitudinal lower members 16, the vertical flanges of each pair of members 16 being located at opposite sides of a track member so as to guide the frame along the tracks. The parts 16, 16, are connected by U-beams 17, 17 and 18, and each pair is further secured to the other member of the pair by L-beams 19, 19, through which pass the bolts 15. It will be noted that apertures 13 are so spaced that the nuts 14 at each end of the frame can pass simultaneously through a pair of apertures in a track member, after which the frame can be separated from the track only by again bringing the parts to a position where the two nuts register with two holes 13, 13.

Cross members 20, 20 in U-beams 17 receive the journals 21 (Fig. 6) of rollers 22, of which there is one at each corner of the frame, these rollers running on tracks formed by the body portions of the U-beams 11, 11.

Cross pieces 23, 23, each secured to a pair of the L-beams 16, serve to carry bolts 24, 24, respectively, these bolts being threaded in bosses 25 on said cross pieces and having heads 26 (Fig. 7) at their lower ends, said heads being each made to bear strongly against the under face of a track-member 11 by turning the bolt and so to clamp the frame against movement along the tracks.

At the rear end of the frame there is a pair of uprights 27, these uprights and their braces 28 standing in a U-beam 17 and being secured thereto in any convenient manner. These parts may be made of steel tubing or the like, braces 28 being preferably bent as shown to increase their bracing action. A cross bar 29 also connects the uprights 27, 27, and each of them is further strengthened by a brace 30, secured at one end to one of the uprights and at the other end to the front U-beam 17. Alined short cylindrical guides 31 secured in superposed relation on the uprights 27 and braces 28 serve to carry a cross-bar 32 by means of which the ball of a tree on the device may be supported at different heights, according to the size of the ball.

At the front end of the frame, a hollow upright is supported, as by slipping a tubular upright 33 on a post 34 secured to the front U-beam 17 (Fig. 6). The tube 33 carries a vertically adjustable rod 35 with a yoke 36 at its upper end. As one means of adjusting said yoke to aline this support with respect to bar 32, or to lift it higher so as to elevate the top of the tree away from the ground, I have shown the rod 35 as having spaced apertures to receive a pin 37 passing through a pair of openings in the tube 33, which apertures are alined crosswise of the device so as to hold yoke 36 in proper position to receive a tree trunk. The front upright is braced by side braces 38, 38, and a rearwardly extending brace 39 whose lower end is set in rear U-beam 17 and fixed thereto. Braces 38 stand in the rear U-beam 17 and are fixed thereto, and similar braces 40 are shown as standing in the front U-beam 17 and fixed to said U-beam and to the inner sides of uprights 27, 27.

In the use of my device for transplanting trees, I may provide a large number of frames for use with a single pair of tracks. These frames may each be applied to a standing tree after removal of a sufficient quantity of earth about its roots to provide a proper tree ball. A ring consisting of a chain or band 42 is located under the roots of the tree and is fastened in place in the usual process of tying and wrapping of the tree ball, as by means of cordage indicated at 43 (Fig. 4) and the tree, while still upright, has the frame or cradle secured thereto by means of bands or wires 44 that are secured to the chain 42, then led through eyes 45 at an elevated position on the uprights 27, 27, and thence forward, as in Fig. 1, to a point at or in front of the front upright where they are wrapped about the trunk of the tree, and about the seat 36, so as to fix the cradle securely to the tree.

When the operator is ready to move a tree so prepared he applies the skids by merely causing two bolt heads 14 to pass through two spaced apertures 13, and sliding the skids a short distance so as to misaline the holes and the bolt heads, then operating the screws 24 to clamp the parts, if desired. Thus the lower ends of the skids provide a fulcrum close to the ball (or in the trench about the tree) and the skids may be used to provide ample leverage to uproot the tree, if desired. This is convenient in the case of shrubs, such as box-bushes. In the case of trees it is usually preferable to hitch directly to the trunk of the tree, and thus uproot it.

After the tree is uprooted the longer roots may be removed and wrapping completed, as usual. Now the whole is in the position of Fig. 1 and the weight is probably too near the rear of the skids. Therefore, the cradle is moved forward along the rails to equalize the weight. Usually this is done by inserting crowbars in the slots of the skids between the U-beam 11 and the adjacent leg of the U-beam 10, the slots between these parts being provided for that purpose. When the cradle has been moved sufficiently far along the tracks the bolts 24 are operated to clamp it in place and the device with its load may be skidded out of a muddy or narrow place in the woods to a point where the tree can be transferred to a truck or trailer or flat car, etc., if desired. Now the clamps are released and the track members are unhooked from the cradle, leaving only the tree on its relatively small cradle to be further transported and manipulated as may be required to bring it to its destination and to set the ball into the hole prepared for it.

The inner or track member may also be made up of two L-shaped members 11', 11', (Fig. 8) fixed to the bottom of a U-beam 10' and spaced to provide a slot 12'. The top flanges of bars 11', 11' are cut away to provide holes 13'. It will be obvious that this is a cheaper construction than that first described, though somewhat less rigid.

It will be obvious to those skilled in the art that the device of my invention may be changed in many ways, all without departing from the spirit of the invention and therefore I do not limit myself to what is described in the specification and shown in the drawings, but only as set forth in the appended claims. I believe myself to be the first to utilize a skiddable appliance in the transportation of trees in connection with the transplanting thereof. The parts which are united to form runners or skids for the entire device, and also to form tracks for the cradle, are individually detachable from the cradle, as is desirable on account of their heavy weight and also as a matter of convenience. The cradle may be moved on the tracks as when the device carries a load, but the tracks can also be individually moved on the cradle, e. g., when the device is unloaded.

My device is useful not only in the removal of trees from their native habitat, but also in replanting them, e. g., in places not readily accessible by a wheeled vehicle. Thus a lot of trees or shrubs, each with a cradle attached thereto may be unloaded at the roadside and then, by the use of a single pair of runners, moved to proper balanced position, hauled across a soft lawn or along narrow, twisted paths, and unloaded in proper position in holes previously prepared to receive them. It will be noted also that the arrangement of braces is such that handling and transportation, as above discussed, will not be likely to damage the apparatus.

Due to the spacing of a number of apertures along the tracks on the runners, a runner may be connected to the cradle at various points in its length, which is a matter of convenience for different positions of the cradle along a tree trunk, or when underbrush or tree branches interfere with convenient placing of a runner. When the runners are shaped similarly at both ends this also permits a runner to be attached to the cradle without the need of reversing its position, regardless of which end is up or down.

Having thus fully described my said invention, what I claim is:

1. A skiddable device for transporting trees, comprising a pair of runners each including a U-shaped bottom member, a track fixed between the side flanges of said member and spaced from at least one of said flanges, a cradle on said track, and tree supporting means on said cradle and spaced lengthwise thereof.

2. Tree transporting means comprising a cradle for a tree trunk, a pair of runners having undercut slots in their upper faces, said slots merging at intervals into relatively wide apertures, and connectors on said cradle having heads wider than said slots but shaped to pass through said apertures.

3. A device as in claim 2, wherein the runner includes a bottom channel iron, an inverted channel iron secured thereto between the flanges of the said bottom channel iron, and wherein said slots are formed in the web of said inverted channel iron between its side flanges.

4. A device as in claim 2, wherein the runner includes a bottom channel iron with spaced apart inverted L-shaped members secured therein between its flanges, the upper webs of the said L-shaped members being correspondingly reduced in width at intervals to form relatively wide apertures.

5. A device as in claim 2, each runner having a plurality of spaced apertures, and there being at each side of the cradle a plurality of similarly spaced connectors.

6. Tree transporting means comprising a pair of runners each provided at the top with a track and a narrow slot in the track, said slot being widened at spaced intervals, a cradle for a tree trunk said cradle having a base adapted to move along said tracks, and connectors on said base spaced correspondingly to said intervals, said connectors having heads shaped to pass through the widened parts of said slots but being wider than the remainder of said slots.

7. A device as in claim 6, including means for clamping the cradle in position on said tracks.

8. A skiddable device for transporting trees, said device comprising a cradle, spaced-apart runners on said cradle, laterally spaced posts at one end of said device, means on said posts for supporting the ball end of a tree, a support located forwardly of said laterally spaced posts for supporting the tree at a point remote from said ball, said support including a single vertically adjustable post on which the tree trunk rests, an annulus at the base of the tree ball, eyes at the upper end of the laterally spaced posts, and tieing means attached to the annulus at opposite sides of the ball, said tieing means passing through an adjacent eye and being secured to the tree trunk adjacent said single post.

9. A skiddable device for transporting trees, comprising a pair of runners, said runners each including a U-shaped bottom member, a pair of laterally spaced tracks located in the trough of each U-shaped member, a cradle shiftable freely along said tracks, clamping members carried by said cradle, and means for operating said clamping members to cause them to grip the tracks and so hold the cradle against movement relatively to said tracks.

10. A skiddable device for transporting trees, comprising a pair of runners, a cradle, means on said cradle for supporting a tree trunk at intervals in its length, each runner including a ground engaging portion and an upright flange, and a track member on each runner for supporting the cradle said track member being parallel to said flange and spaced therefrom to permit entry of a lever between them for moving the cradle along said track.

11. A device as in claim 10, including means for securing the cradle in adjusted relation to the runners.

12. Tree transplanting means comprising a rigid unitary cradle, spaced supports on the cradle for engaging a tree trunk at spaced intervals in its length, detachable skids for said cradle, tracks at the upper side of said skids, and rollers on the cradle in contact with said tracks.

13. Tree transplanting means comprising a rigid unitary cradle, spaced supports on the cradle for engaging a tree trunk at spaced intervals in its length, means for securing said cradle to the trunk of a standing tree, headed projections on the bottom of the cradle, and skids having undercut slots in their upper faces to receive the heads of said projections, whereby said skids can be quickly attached to a cradle on a tree.

14. Tree transporting means comprising a cradle, supports on said cradle and spaced lengthwise thereof for carrying a tree trunk, channel-shaped ground-engaging runners of substantially greater length than said cradle, tracks secured within the runners and extending lengthwise of said runners and on which said cradle may be manually pushed along said runners, and means for fastening the cradle to the runners in desired adjusted position, said means coacting with the lower part of the cradle and with the tracks at points remote from the ground-engaging surfaces of the runners.

ACY L. PEARSON.